United States Patent [19]

Doemens et al.

[11] Patent Number: 5,088,828

[45] Date of Patent: Feb. 18, 1992

[54] METHOD AND APPARATUS FOR THREE-DIMENSIONAL TESTING OF PRINTED CIRCUITBOARDS

[75] Inventors: Guenter Doemens, Holzkirchen; Richard Schneider, Taufkirchen, both of Fed. Rep. of Germany

[73] Assignee: Siemens Aktiengesellschaft, Berlin and Munich, Fed. Rep. of Germany

[21] Appl. No.: 468,218

[22] Filed: Jan. 22, 1990

[30] Foreign Application Priority Data

Feb. 28, 1989 [DE] Fed. Rep. of Germany ....... 3906288

[51] Int. Cl.⁵ .......................... G01B 11/24; H01J 5/16
[52] U.S. Cl. .................................. 356/376; 356/380; 250/227.28
[58] Field of Search ................... 356/376, 1, 141, 152, 356/375, 380; 250/227.28, 227.32

[56] References Cited

U.S. PATENT DOCUMENTS

| | | | |
|---|---|---|---|
| 3,612,888 | 10/1971 | Boucher | 250/227.28 |
| 3,771,873 | 11/1973 | Tourret | 250/227.28 |
| 3,906,220 | 9/1975 | Delingat | 250/227.28 |
| 4,343,553 | 8/1982 | Nakagawa et al. | 356/376 |
| 4,900,146 | 2/1990 | Penney et al. | 356/376 |

OTHER PUBLICATIONS

"Technische Optik", Walter de Gruyter, Berlin, New York, 1974, pp. 52-57, Dr. Hermann Slevogt.

*Primary Examiner*—Richard A. Rosenberger
*Assistant Examiner*—Hoa Pham

[57] ABSTRACT

Testing techniques for three-dimensional testing of printed circuit boards overcome the disadvantages that presently exist such as, for example, too little height resolution, low processing speed and difficult manipulation. The testing in the microscopic domain occurs within unaltering, displaceable evaluation windows on the basis of the calculation of cross-sectional areas at each scan point on a printed circuit board. Microscopic testing occurs on the basis of the calculation of defined, simple geometric values within a scan field and by following comparisons to reference values. The arrangement for the implementation of the methods utilize a laser scanner for triangulation, an evaluation unit, and at least one high-resolution, position-sensitive detector.

5 Claims, 3 Drawing Sheets

METHOD AND APPARATUS FOR THREE-DIMENSIONAL TESTING OF PRINTED CIRCUITBOARDS

CROSS REFERENCE TO RELATED APPLICATION

This application is related to the application Ser. No. 465,767, filed Jan. 16, 1990, now abandoned.

BACKGROUND OF THE INVENTION

1. Field of the Invention

The present invention relates to a method and to an apparatus for three-dimensional testing of printed circuit boards on the basis of identified, spatial surface coordinates for the recognition of defects at the structures in (1) the microscopic domain on the basis of a planar, local evaluation window and current calculation of cross sectional areas; (2) the microscopic domain on the basis of a reference/actual value comparison within predetermined grid fields.

2. Description of the Prior Art

With increasing miniaturization of the structures on interconnects, the width of the interconnects is approaching the height of the interconnects. Since the electrical properties of the interconnects are critically determined by their cross sections, the height must also be checked in addition to the width in order to guarantee the required cross section. Current, automated methods are largely optical inspection systems that work with two-dimensional image evaluation. For testing structures that lie in the range of $10^{-5}$m, both a high resolution in the planar form and in the three-dimensional form are important. One possibility of acquiring the surface structures is scanning the surface with laser triangulation. The optical scan beam generated by the laser unit is thereby picked up by a topically resolving receiver. Such optical receivers are referred to as position-sensitive photodetectors.

The inspection systems that are currently commercially available are affected by the following deficiencies:

the height resolution is too low, for example, only three height steps;

the processing speed is too low for current needs; and the manipulation is too complicated.

SUMMARY OF THE INVENTION

The object of the present invention is to provide methods with which the structures of printed circuit boards can be automatically checked in the microscopic and macroscopic domains and without the disadvantages set forth above. An attendant object is to provide an arrangement for the implementation of the aforementioned methods.

An object of the invention is achieved in a method for three-dimensional testing of printed circuit boards on the basis of identified, spatial surface coordinates (X, Y, Z) for the recognition of defects at the structures in the microscopic domain on the basis of a planar local evaluation window, whereby every scanned point having the planar coordinates (X, Y) is pushed once through the center point of the planar, local evaluation window;

the position of cross sectional areas is determined by the center point;

the cross sectional areas are determined by the boundaries of the evaluation window and by the surface of the interconnect;

the calculation of each individual cross sectional area occurs by summing up the differential areas arising that are prescribed by the uniform, planar scanning of surface coordinates;

the evaluation of the values obtained for the cross sectional areas occurs in comparison to the prescribed, required width and height of the interconnect; and a prescribed, minimum spacing between two neighboring interconnects is checked by identifying the width of the regions having the height value of zero. An object of the invention is also achieved in a method for three-dimensional testing of printed circuit boards on the basis of identified, spatial surface coordinates (X, Y, Z), whereby microscopic defects at the structures are recognized by the reference/actual value comparison with the predetermined scanned fields and, for the reference/actual value comparison, the overall volume of all interconnects, the center of gravity of the overall volume of all interconnects, the overall area of insulation regions, and the center of gravity of the overall surface of the insulation regions are identified and compared to the corresponding values of a reference.

Another object of the invention is achieved in an arrangement for implementing the above methods which is composed of a laser scanner for height measurement on the basis of triangulation;

at least one position-sensitive detector having at least 30 differentiable height steps; and an evaluation unit.

The invention is based on the perception that the calculation of the cross sections of the interconnects and the calculations of the width of the interspaces as well as a comparison of the values obtained with prescribed limit values can be realized as a reliable control for the detection of faults at the raised structures, i.e. the interconnects on printed circuit boards. This occurs with the planar, local evaluation windows, whereby the evaluation window is respectively formed around a defined, scanned point in accordance with the rastering prescribed by the plurality and position of scanned points and whereby the described, perpendicularly residing cross sectional surfaces contain this point, the center point of the evaluation window. Each light spot produced on the printed circuit board surface by the laser triangulation becomes the center point of an evaluation window once during testing of the printed circuit board. This evaluation occurs in real time and with high resolution. This means that, after the calculation of two or more cross sectional surfaces, the direction in which the interconnect extends is recognized at some selected point about which an evaluation window was placed and, therefore, an allocation of the cross sectional surfaces to the course of the interconnect is possible.

With the assistance of the zero height level, a check is likewise carried out in the microscopic domain and with the same method as set forth above to see whether a defined minimum width was observed between two neighboring printed circuit board paths and whether metalizations potentially forming shorts and having a finite height that is greater than zero are present. A high test precision can likewise be carried out in the microscopic reference/actual value comparison with reference to predetermined grid fields by calculating specific, characteristic values, such as volume or area or the center of gravity thereof.

Due to the miniaturized structures of the interconnects and printed circuit boards, an arrangement for the implementation of the methods that enable a height measurement with laser scanning and triangulation must contain a position-sensitive detector that satisfies certain minimum requirements with respect to the height differentiation. The minimum plurality of differentiable height steps should lie at 30; as a rule, however, the position-sensitive detectors are equipped with at least 50 differentiable height steps.

A specific feature of the invention with reference to the recognition of defects at structures in the microscopic domain provides that at least four cross-sectional surfaces are calculated for an evaluation event. This measure guarantees an adequate precision of the three-dimensional testing.

For simplifying the method, the perpendicularly residing cross-sectional surfaces that all contain a center point of the current evaluation window are placed such that they form identical angles with one another.

A further feature of the invention with respect to the microscopic evaluation of defects provides that a plurality of scanned fields following one another are compared that are slightly offset relative to one another in order to compensate allowable warpings, i.e. dilatations, for example, due to temperature influences. It can thereby be meaningful to select a diagonal offset of the grid fields since the evaluation windows are essentially rectangular and their sides preferably extend parallel to the interconnects.

A feature of the invention for the implementation of the methods employs at least two position-sensitive detectors, wherewith it is essentially the shadowing of small elevations that is avoided. Shadowings can lead to mismeasurements when, for example, a relatively large structure is arranged next to a small structure and the observation beam cannot be guided unimpeded in the direction of the location-sensitive detector in the height measurement of the small structure.

In order to optimize the speed of the methods, the utilization of a position-sensitive detector with which a fast readability is guaranteed in addition to the high resolution is provided in accordance with a further feature of the arrangement of the invention. To this end, the receiver surface of the detector is topically separated from the necessary opto-electronic transducers. The receiver surface is composed of a plurality of light conductors that are fashioned as optical cross sectional transducers having a constant cross-sectional area. The plurality of light conductors corresponds to the plurality of opto-electronic transducers. The plurality of light conductors that represents a type of one-dimensional grid at one side due to the ordered bundling of approximately rectangular ends, namely representing the receiver surface, have their outer ends that have an approximately circular cross section connected to a respectively-assigned opto-electronic transducer. The opto-electronic transducers are, in turn, electrically connected to an evaluation unit. What is therefore enabled is that an imaging on the receiver surface, for example a light spot, is accurately detected along the detector-referred coordinate direction in accordance with the high plurality of existing, differentiable height steps and, further, that the read-out event in the detection occurs immediately. What is thereby to be understood by immediately is that no serial read-out at all is present. The information at the receiver surface are read out in parallel, are supplied to the evaluation unit in parallel and are processed correspondingly fast.

In order to compensate what is referred to as the Scheimpflug effect, the individual light conductors at the location of the receiver surface are respectively arranged offset relative to one another and therefore form a step shape. The Scheimpflug effect or condition states that, in general, when a subject plane that is inclined relative to the optical axis of the imaging lens is to be sharply imaged onto an image plane, the image plane must be inclined relative to the axis such that it penetrates the center plane of the lens in the same track line that the subject lens supplies with the center plane, as set forth by Dr. Hermann Slevogi in the textbook "Technische Optik", Walter de Gruyter, Berlin, New York, 1974, pp. 52–57. Since the alignment of the receiver surface is prescribed by the geometry of the triangulation method, the incident light can nonetheless be coupled in approximately perpendicularly despite a non-perpendicular incidence of the light onto the receiver surface, since the ends of the light conductors within the receiver surface do not reside perpendicularly thereto, but approximately parallel to the direction of light incidence. This leads to a higher efficiency.

The utilization of a fluorescent light detector that detects the fluorescent light arising upon incidence of the laser beam on insulation material guarantees an accurate monitoring of the zero height level.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
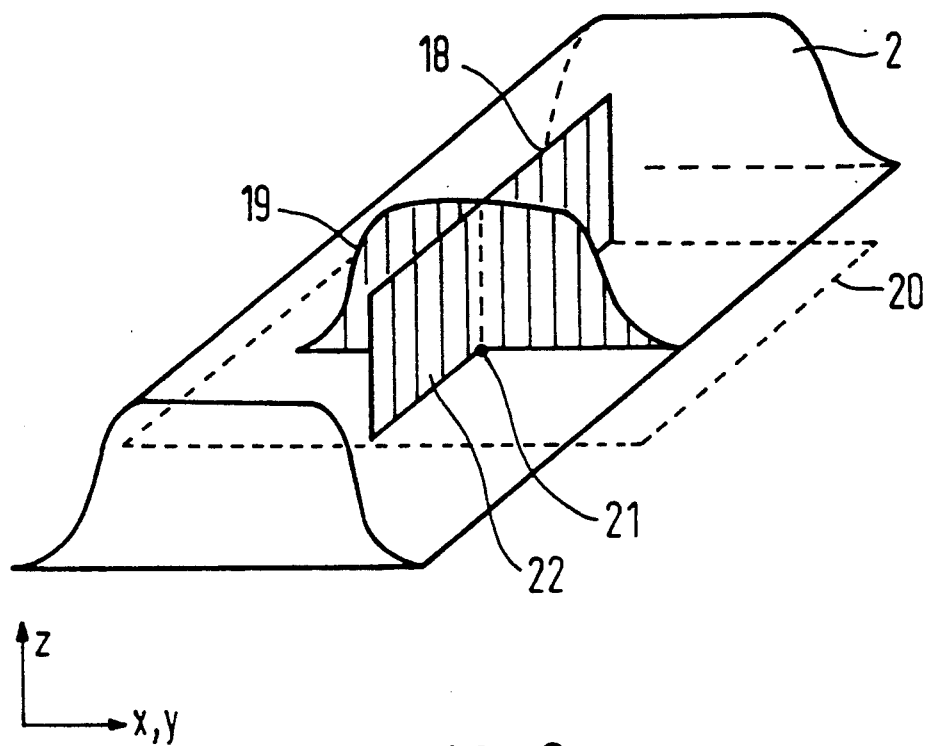
FIG. 1 is a perspective view of a portion of an interconnect of a printed circuit board shown with an evaluation window.

FIG. 1 illustrates a portion of an interconnect 2 in which an evaluation window 20 that must be larger than the interconnect width is positioned. The evaluation window 20 has the center point 21 that is defined by only the planar coordinate directions X, Y. The local calculation of the cross-sectional areas 18, 19 occurs by summing up the differential areas 22 within the evaluation window 20. The differential areas 22 arise when scanning the surface, whereby each area is limited by two successive scan points and by the perpendicular extending through the points that is thereby defined. The evaluation window 20 is placed about each scanned point of the surface. A lower plurality of evaluation events, for example, an evaluation window around each second scan point, would occur at the expense of test reliability. As a rule, cross-sectional areas 18, 19 offset relative to one another are calculated.

Figure 2:
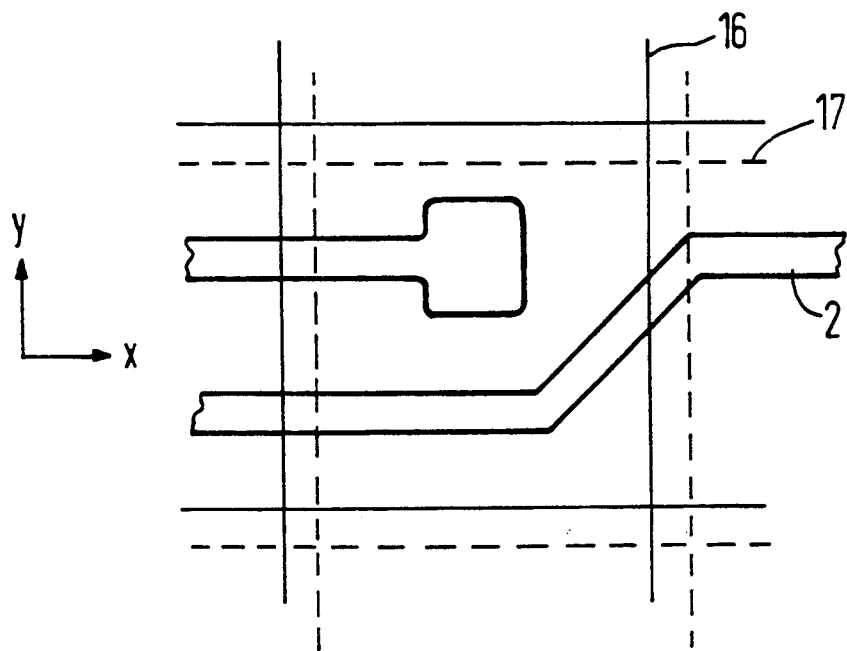
FIG. 2 illustrates two grid fields slightly offset relative to one another and having interconnects lying therein.

FIG. 2 illustrates the scan fields 16 and 17 that are slightly diagonally shifted relative to one another. Relatively simple, geometric quantities such as the overall volume of all conductors, overall area of the insulation regions or, correspondingly, the centers of gravity of these values are calculated for each scan field 16, 17. The comparison between two scan fields 16, 17, offset relative to one another, makes it possible to compensate allowable warpings within the printed circuit boards with respect to the testing.

Figure 3:
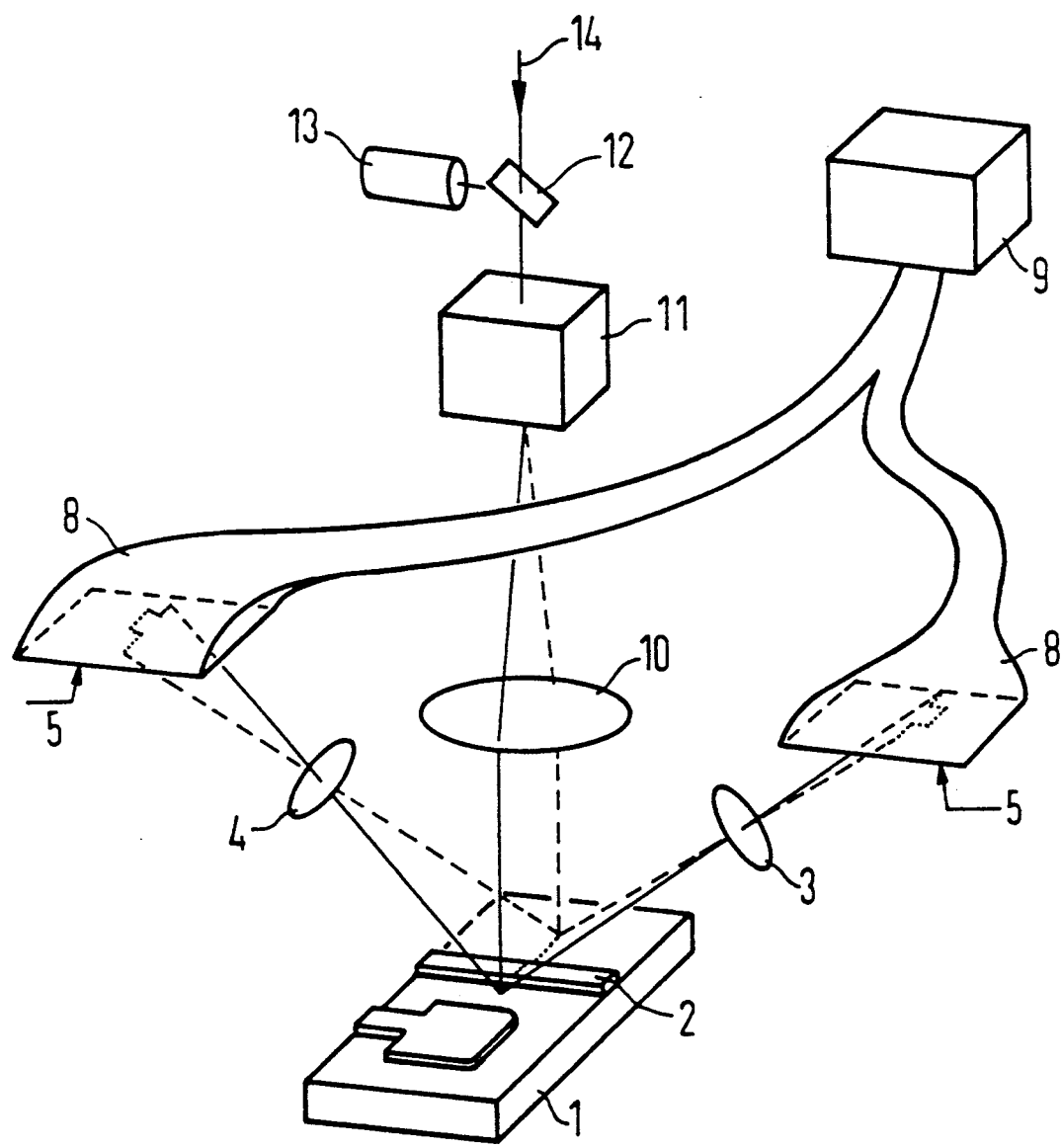
FIG. 3 is a schematic representation of an arrangement for the implementation of the method having two position sensitive detectors.

FIG. 3 shows an arrangement of the invention for the implementation of the methods. A printed circuit board 1 having interconnects 2 is scanned with a laser beam 14, a divided mirror 12, a beam deflector 11 and a scan objective 10. The scan beam 14 is correspondingly scattered by the printed circuit board surface and the observation beam or beams are conducted via a pair of objectives 3, 4 to a pair of receiver surfaces 5 of position-sensitive photodetectors 8. An evaluation unit 9 can quickly process the generated signals.

Figure 4:
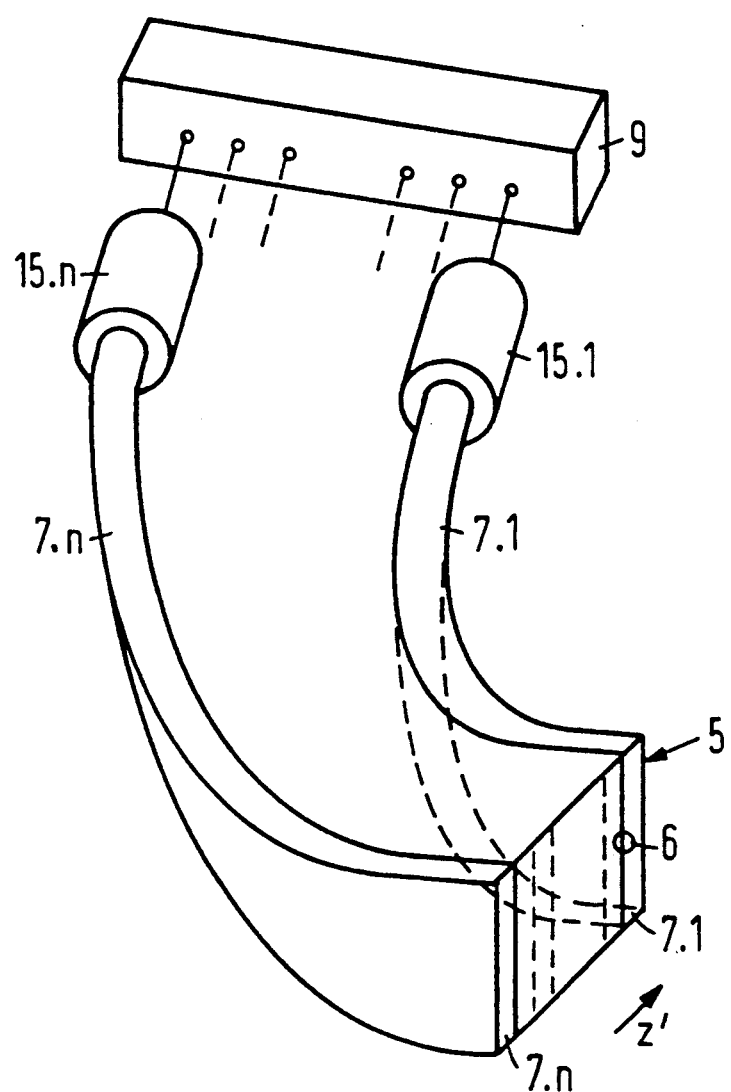
FIG. 4 is a schematic representation of a high-resolution resolution position-sensitive photodetector that reads out in parallel.

FIG. 4 illustrates a high-resolution, position-sensitive detector 8 that is electrically connected to an evaluation unit 9. The receiver surface 5 is composed of light conductors 7.1-7.n bundled in ordered fashion and can detect along the detector-referred coordinate direction Z'. The opto-electronic transducers 15.1-15.n convert the incoming light signal into electrical signals. Avalanche diodes are usually employed for this purpose in order to obtain a faster signal processing. The light conductors 7 are either films of light conducting material or are packages composed of a plurality of approximately round optical fibers arranged side-by-side.

Given utilization of films, rectangular strips are used that, first of all, are planarly fashioned and bundled in ordered fashion towards the receiver surface 5 and that, secondly, are rolled together for connection to the opto-electronic transducers 15. A plurality of optical fibers lying side-by-side can be correspondingly manipulated. The cross sections of the light conductors 7 are identical at each location. The parallel connection of a plurality of position-sensitive detectors 8 is meaningful for enhancing the test reliability. Shadowings are thereby avoided (see FIG. 3). Those light conductors 7 of a plurality of position-sensitive detectors 8 that correspond to one another are thereby connected parallel to a respective opto-electronic transducer and the overall plurality of the transducers remains constant, i.e. equal in number to that of a plurality of light conductors illustrated in FIG. 4 for a single light receiver.

The position-sensitive detectors that are utilized have at least 30 differentiable height steps. As a rule, however, 50-100 differentiable height steps are employed. The method for recognizing errors in the microscopic domain occurs in real time, in contrast whereto the method for the recognition of microscopic errors is carried out by the reference/actual value comparison, for example with a master or with a CAD image. As a rule, a printed circuit board is scanned in strips in the form of a meander.

The evaluation windows or scan fields that are usually rectangularly fashioned contain, for example, $10^2$ or, respectively, $100^2$ pixels. A pixel is thereby to be understood as the standard abbreviation for "picture element". An increase in the evaluation from $10^5$ per second (prior art) to $10^6$-$10^7$ pixels per second is enabled in practicing a method of the invention and with a corresponding arrangement constructed in accordance with the invention.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for three-dimensional testing of printed circuit boards on the basis of identified, spatial surface coordinates for recognizing defects at interconnects in the microscopic domain carried spaced on a surface of a printed circuit board on the basis of a local evaluation window, comprising the steps of:

scanning the surface of a printed circuit board, including interconnects, point-by-point to define cross-sectional areas of an interconnect partially limited and defined by two successive scan points and by the perpendicular extending through the successive scan points;

forming an evaluation window on the interconnect-carrying surface of the printed circuit board about scan point and wider than a scanned interconnect and over a portion of the length of the interconnect to further limit and define the cross-sectional areas and define a zero datum;

calculating the cross-sectional areas by summing differential areas of the defined cross-sectional areas;

comparing the summed areas with prescribed interconnect width and height; and checking the spacings between interconnects by identifying the widths of areas having a height value of zero.

2. The method of claim 1, wherein the step of calculating is further defined as:

calculating at least four cross-sectional areas for an evaluation.

3. The method of claim 1, wherein a step of scanning is further defined as:

scanning to define the cross-sectional areas at the center point of the evaluation window and perpendicular to one another.

4. A method of testing printed circuit boards on the basis of identified, spatial surface coordinates whereby microscopic defects at the interconnects carried on a surface of a printed circuit board separated by insulation regions are recognized by a reference/actual value comparison of predetermined scan fields, comprising the steps of:

scanning the surface of a printed circuit board, which carries the interconnects, on a grid basis which defines scan fields;

calculating the volume of all interconnects of each scan field;

calculating the center of gravity of the interconnect volume of each scan field; and comparing the calculated values with corresponding reference values.

5. The method of claim 4, wherein the step of comparing is further defined as:

comparing the calculated values for a plurality of scan fields that are slightly offset relative to one another to determine warping.

* * * * *